Jan. 12, 1954  R. J. WYNNE  2,665,496
INTERNAL COMPARATIVE GAUGE
Filed July 25, 1949  2 Sheets-Sheet 1
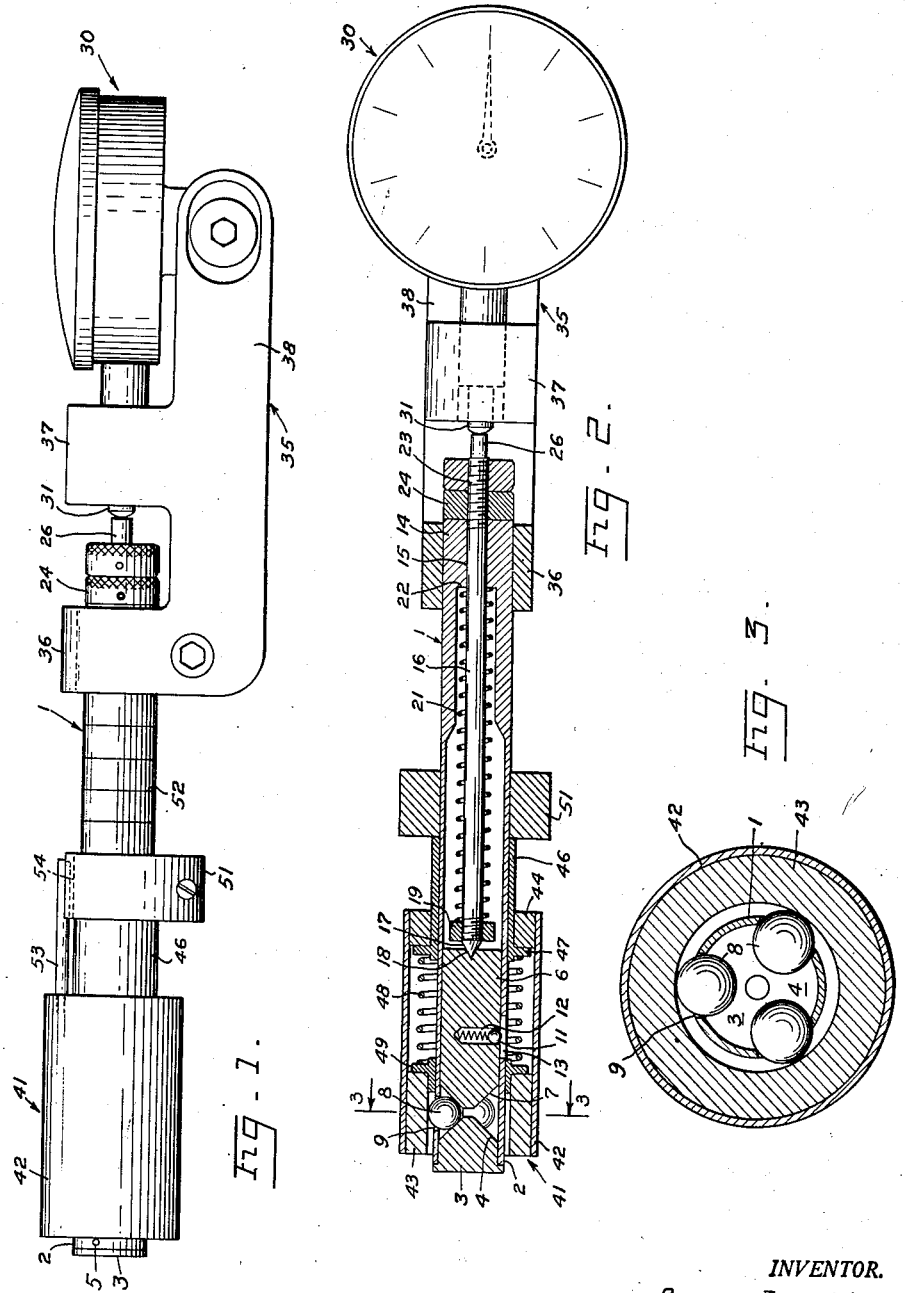
INVENTOR.
ROBERT JOHN WYNNE
BY White & Riaboff
ATTORNEYS Jan. 12, 1954
R. J. WYNNE
2,665,496
INTERNAL COMPARATIVE GAUGE
Filed July 25, 1949
2 Sheets-Sheet 2
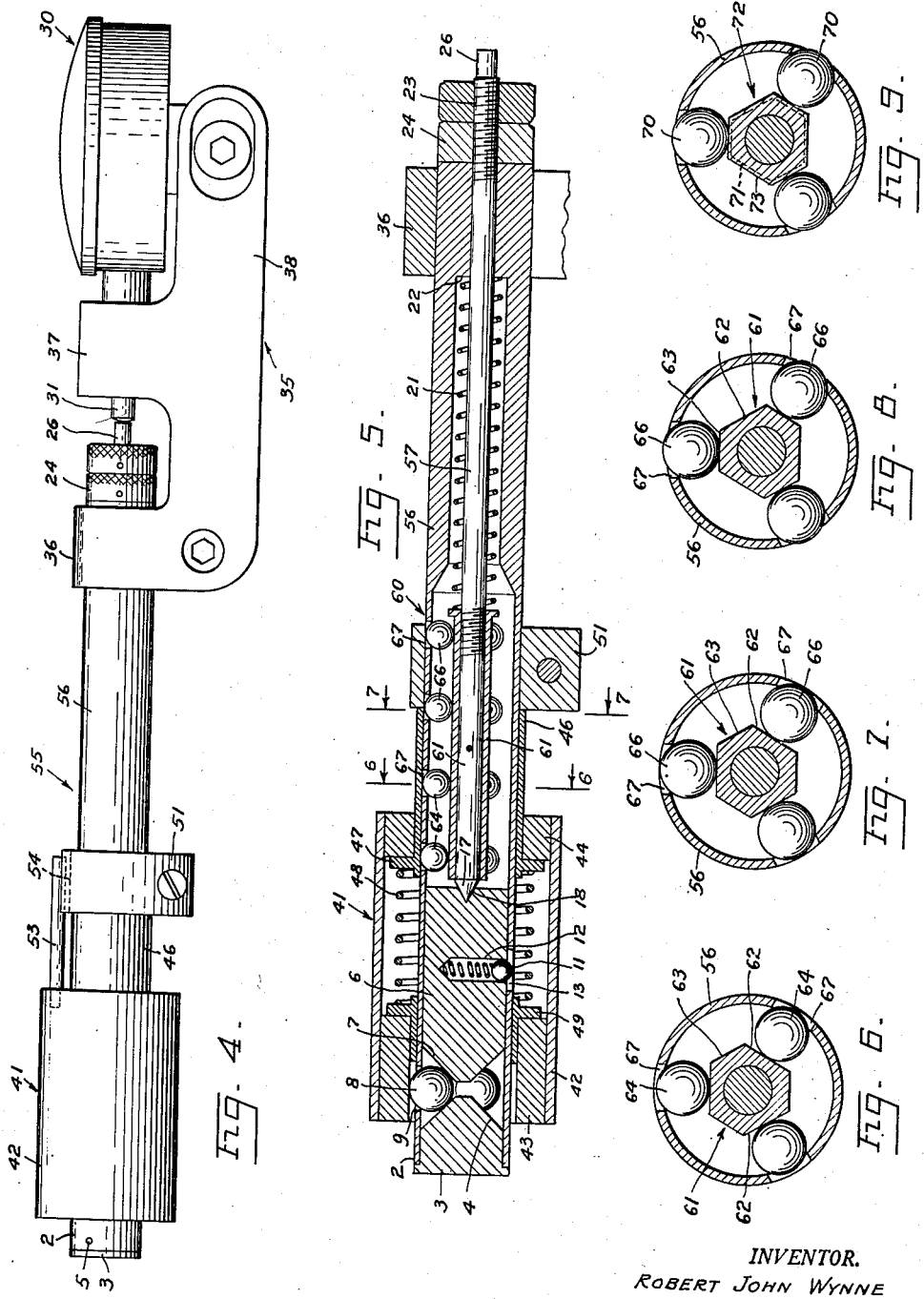
INVENTOR.
ROBERT JOHN WYNNE
BY White & Riaboff
ATTORNEYS Patented Jan. 12, 1954

2,665,496

UNITED STATES PATENT OFFICE 2,665,496

INTERNAL COMPARATIVE GAUGE

Robert J. Wynne, Oakland, Calif.

Application July 25, 1949, Serial No. 106,597

7 Claims. (Cl. 33—178)

1

This invention relates to an internal comparative gauge and is an improvement on the gauge shown and described in my copending application for the United States Patent Serial No. 768,195 filed August 12, 1947, now Patent No. 2,631,378, issued March 17, 1953.

The object of this invention is to provide an instrument of the type described which permits to compare the diameter of a bore with a standard bore, and which shows the deviation from such standard bore with great exactness.

Another object of this invention is to provide a slidable standard gauge ring on said instrument by which the latter may be set at zero and the measurements may be taken by said instruments indicating the deviations from said standard gauge ring.

Another object of this invention is to incorporate into the instrument of the type described a minimum and maximum diameter gauge which operates in conjunction with the diameter measuring gauge.

Another object of this invention is to provide an instrument having various guards assuring the uniformity of measurements.

Other objects and advantages will appear as the specification proceeds and the particular features of the invention will be specifically pointed out in the appended claims.

My invention is illustrated in the accompanying drawing forming a part of this specification in which:

Fig. 1 is a side view of the instrument.

Fig. 2 is a central horizontal cross section of the instrument.

Fig. 3 is a cross section taken along the line 3—3 of Fig. 2.

Fig. 4 is a side view of a modified form of the instrument.

Fig. 5 is a central vertical cross section of the instrument shown in Fig. 4.

Fig. 6 is a cross section taken along the line 6—6 of Fig. 5.

Fig. 7 is a cross section taken along the line 7—7 of Fig. 5.

Fig. 8 is identical with Fig. 7 but showing the balls in different position; and Fig. 9 shows a different arrangement of the minimum and maximum gauge.

In detail the internal comparative gauge shown in Figs. 1, 2 and 3 consists of a tube 1, an end 2 of which has a wide bore closed by a plug 3. The latter is formed with a frusto-conical surface 4 projecting into the tube along the central longitudinal axis thereof. The plug 3 is fixedly secured to said tube by a pin 5, or other means.

2

A reciprocating anvil 6 is slidably arranged in said tube in close proximity to said plug. The anvil 6 has a frusto-conical surface 7 facing the surface 4. In the space limited by said conical surfaces and the tube 1 are three equally spaced steel balls 8. The tube 1 is formed with three slots 9, each located opposite a respective ball 8, said slots permitting said balls to protrude through said tube to a certain extent, but being small enough to retain said balls in the tube.

Means may be provided to prevent said reciprocating anvil 6 from rotating in the tube 1, said means may consist of a spring pressed ball 11, confined in a bore 12, and a longitudinal slot 13 in the tube 1, said slot being of width sufficient to contain said ball 11 within the bore 12, yet permitting it to ride along the same.

The other end 14 of the tube 1 is formed with a comparatively narrow bore 15 through which passes a reciprocating shaft 16. The latter extends from said bore to the anvil 6 and has an end thereof formed into a cone 17 which enters a conical depression 18 in said anvil. A spring stop 19 is fixedly arranged on the shaft 16 near the cone 17. A coil spring 21 extending from said stop to the shoulder 22 of the tube 1 constantly pushes said shaft 16 and the anvil 6 toward the plug 3, thus forcing the balls 8 to spread radially through the slots 9.

The other end 23 of the shaft 16 extends beyond the end 14 of the tube 1 and carries a pair of locking nuts 24 tightly screwed thereon, which nuts limit the motion of the shaft 16 toward the end 2 of the tube. The shaft 16 terminates beyond said nuts 24 with a portion 26 of reduced diameter.

If the end 2 of the tube 1 is inserted into a bore of such size that the balls 8 are forced inwardly, the movement of said balls toward the central axis of the tube 1 forces the reciprocating anvil 6 to move toward the end 14 of said tube, and thereby pushes the shaft 16 against the compression of the spring 21. The longitudinal displacement of the shaft 16 is transmitted to, and registered by, a standard dial 30 through a stub shaft 31 contacting the portion 26 of the shaft 16.

The tube 1 is rigidly connected to the dial 30 by an adapter 35, having a clamping member 36 to hold the end 14 of the tube 1, a thumb member 37 through which the stub shaft 31 passes and a body 38 carrying said members and the dial, the latter being rigidly attached to said body.

The instrument above described is adapted to indicate accurately the deviation from a standard bore. Hence, a slidable gauge 41 is arranged on said instrument in such a way as to be readily used for checking the reading on the dial 30, which is usually set at zero, and to be moved away when a bore is measured. Deviation from zero on the dial 30 indicates the difference between the standard bore and the bore measured.

The slidable gauge 41 is arranged on the tube 1 near the end 2 thereof and it consists of a tubular housing 42, one end of which, facing said end 2, carries a sandard ring gauge 43. The latter may be attached to the housing 42 by any means, permitting an easy substitution of one gauge 43 by another. The other end of the housing 42 is closed by a removable retaining collar 44 slidable over a pressure sleeve 46, which in turn is slidable over the tube 1. The sleeve 46 has a flange 47 abutting an inner wall of the retaining collar 44, which serves as a stop for a coil spring 48 arranged between said flange and a ring gauge sleeve 49. The pressure sleeve extends to an adjustable stop collar 51.

The instrument operates as follows. Suppose a plurality of bores have to be checked. A standard ring gauge 43 of a proper diameter is installed in the housing 42, and the dial 30 is set at zero. Thereupon the end 2 of the instrument is pushed in a bore. The housing 42 slides toward the stop collar 51 until it is stopped by the latter, thus exposing the balls 8. The dial 30 registers the deviation, if any, from zero reading, thus indicating the difference between the standard ring gauge diameter and the diameter of the measured bore at a certain depth.

If it is desirable to measure the diameter of a bore at a different depth, the stop collar 51 is moved to a new position on the tube 1. In order to assist in finding a proper position for the stop collar, the tube 1 is provided with circular divisions 52. This is particularly useful in measuring tapered bores wherein two measurements have to be taken at predeterminate depth.

To assure the uniformity of the measurements, taken by said instrument, the relative position of the ring gauge 43 and the tube 1 is uniformly maintained by a pin 53 extending from the retaining collar 44 and entering a depression 54 in the adjustable stop collar 51, which is affixed on the tube 1. By this arrangement the ring gauge maintains the same relative position with the tube 1 and the balls 8.

Figures 4 to 9 show a modified form of my instrument which includes the maximum and minimum gauges in addition to the above described bore gauge.

The modified instrument 55 consists of a tube 56 which is somewhat longer than the corresponding tube 1 of the previously described instrument, and which contains the same plug 3 with the frusto-conical surface 4 and a reciprocating anvil 6 with its frusto-conical surface 7. Between said surfaces are arranged three balls 8 which protrude beyond the tube 56 through the slots 9 therein. The motion of the reciprocating anvil 6 is transmitted to the standard dial 30 by a shaft 57 which is somewhat longer than the corresponding shaft 16 in the above described instrument. The instrument 55 is provided with the slidable gauge 41 for checking the same.

The instrument 55, in addition to the gauge for measuring the inner diameters of bores in the manner above described, contains a minimum and maximum gauge 60. The latter comprises a sleeve 61 screwed onto the end of the shaft 57 abutting the anvil 6. The sleeve 61 is hexagonal in shape, but three of the alternating sides 62 thereof are slightly closer to the central axis of the shaft 57 than the other three sides 63. Around said sleeve 61 and abutting the sides 62 of the same are two rows of balls 64 and two rows of balls 66, each row consisting of three balls. The balls 66 are slightly bigger diameter than the balls 64. Each ball is held in its place by a slot 67 provided in the tube 56 opposite each ball and which slot said balls partially occupy.

As shown in Figs. 6 and 7, when the balls 64 and 66 abut the sides 62 of the sleeve 61, said balls are within the outer circumference of the tube 56 and do not protrude beyond the same. But when the shaft 57 and the sleeve 61 are rotated 60°, the balls 64 and 66 are pushed outwardly by the sides 63 of said sleeve, through the slots 67, as shown in Fig. 8. As the diameter of the balls 64 is less than the diameter of the balls 66, the latter protrude slightly more than the first.

The balls 64 and 66 are so selected as to constitute the minimum and the maximum gauge respectively. In order to use said minimum and maximum gauge, the slidable gauge 41 is removed and the stop collar 51 is moved to a desired place between the gauge 60 and the adapter 35. Thereupon the end 2 of the tube 56 is inserted in the bore to be checked. If the balls 64 pass through said bore, the same is bigger than certain minimum diameter. If the balls 66 do not pass into said bore, the same is less than a certain maximum. This arrangement permits quick and convenient inspection of the bores which have to be within certain limits. By the use of the stop collar 51, all bores may be checked at the same uniform depth. The double row of the balls 64 and 66 assures the exactness of the measurement, as the instrument has to be inserted along the central axis of the bore.

Fig. 9 shows a modified form of the minimum and maximum gauge, in which all balls 70 are of the same diameter, but the portion 71 of the sleeve 72, facing the balls 70 constituting the minimum gauge, is of slightly smaller lateral dimensions than the corresponding dimensions of the portion 73 facing the balls of the maximum gauge. The operation of this gauge is the same as that of the previously described.

I claim:

1. An instrument for comparing inner diameters of bores with a standard bore, comprising a tube, a fixed plug in one end of said tube having a conical surface, a movable anvil having a conical surface, a plurality of balls between said surfaces, said tube having slots through which said balls are adapted to protrude, a standard ring gauge having an accurate bore normally over and cooperating with said balls and adapted to be pushed away to expose said balls while said end of the tube is inserted into a bore to be compared with the bore of the standard ring gauge, means retaining said ring gauge for movement relative to said tube, a dial for indicating the difference between the standard gauge bore and the measured bore, and means operatively connecting said dial and said movable anvil.

2. An instrument of the class described, comprising a tube having a plurality of slots arranged circumferentially therein, a plurality of balls inside of said tube adapted to move radially and partially through said slots, a dial adapted to register said radial movement of said balls, a standard ring gauge having an accurate standard bore, said ring gauge being normally over and cooperating with said balls and being adapted to be moved away when the instrument is inserted into a bore to be measured, and means retaining said ring gauge for movement relative to said tube.

3. An instrument for comparing an inner diameter of bores with a standard bore, comprising a tube having three slots circumferentially arranged therein, three balls inside of said tube adapted to move radially and partially through said slots, a dial adapted to register the radial movements of said balls, means operatively connecting said balls with said dial, a standard ring gauge having an accurate standard bore, said ring gauge being normally over said balls and adapted to be moved away when said instrument is inserted into a bore to be measured, and means retaining said ring gauge for movement relative to said tube.

4. An instrument for comparing an inner diameter of bores with a standard bore, comprising a tube having three slots circumferentially arranged therein, three balls inside of said tube adapted to move radially and partially through said slots, a dial adapted to register the radial movements of said balls, means operatively connecting said balls with said dial, a standard ring gauge having an accurate standard bore, said ring gauge being normally over said balls with said bore cooperating with said balls and adapted to be moved away when said instrument is inserted into a bore to be measured, means retaining said ring gauge for movement relative to said tube, and means for limiting the insertion of the instrument into a bore to a certain predeterminate depth.

5. An instrument for comparing an inner diameter of bores with a standard bore, comprising a tube having three slots circumferentially arranged therein, three balls inside of said tube adapted to move radially and partially through said slots, a dial adapted to register the radial movements of said balls, means operatively connecting said balls with said dial, a standard ring gauge having an accurate standard bore, means retaining said ring gauge for movement relative to said tube, said ring gauge being normally over and cooperating with said balls and adapted to be moved away when said instrument is inserted into a bore to be measured, a stop arranged on said tube, said standard ring gauge being normally over said balls and adapted to be moved into abutment with the stop, and means for returning said ring gauge to its normal position.

6. An instrument for comparing the inner diameter of a bore with a standard bore, comprising a tube having openings circumferentially formed thereon, pressure members inside of said tube adapted to move radially through said openings, a dial adapted to register the radial movements of said pressure members, means operatively connecting said pressure members with said dial, a ring gauge having an accurate bore adapted to cooperate with said pressure members to indicate an initial position on said dial, and means retaining said ring gauge for movement relative to said tube, said ring gauge being normally over said pressure members and adapted to be moved away when said instrument is inserted in a bore to be measured, whereby with one insertion of the instrument a bore to be measured may be compared with an accurate standard.

7. An instrument for comparing the inner diameter of a bore with a standard bore, comprising a member for insertion in a bore, pressure means associated with said member and being adapted to move radially with respect to said member, said pressure means being with a portion thereof adapted to contact the inside of a bore to be measured, a dial adapted to register the radial movements of said pressure means, means operatively connecting said pressure means with said dial, a ring gauge having an accurate bore adapted to cooperate with said pressure means to indicate an initial position on said dial, and means retaining said ring gauge for movement on said member, said ring gauge being normally over said pressure means and adapted to be moved away when said instrument is inserted in a bore to be measured, whereby with one insertion of the instrument in a bore to be measured the bore may be compared with an accurate standard.

ROBERT J. WYNNE.

References Cited in the file of this patent

UNITED STATES PATENTS

| Number | Name | Date |
|---|---|---|
| 1,169,327 | Hess | Jan. 25, 1916 |
| 1,452,834 | Fuchs | Apr. 24, 1923 |
| 1,972,124 | Aldeborgh et al. | Sept. 4, 1934 |
| 2,249,954 | Hellberg et al. | July 22, 1941 |
| 2,381,491 | Emmerton | Aug. 7, 1945 |
| 2,454,159 | Graves | Nov. 16, 1948 |
| 2,455,347 | Anderer | Dec. 7, 1948 |
| 2,456,497 | Forsmark | Dec. 14, 1948 |
| 2,471,737 | Fox | May 31, 1949 |

FOREIGN PATENTS

| Number | Country | Date |
|---|---|---|
| 218,397 | Switzerland | Apr. 16, 1942 |
| 551,356 | Great Britain | Feb. 18, 1943 |
| 882,970 | France | June 21, 1943 |